US012420891B1

(12) United States Patent
Wang et al.

(10) Patent No.: US 12,420,891 B1
(45) Date of Patent: Sep. 23, 2025

(54) RELEASE DEVICE FOR POLAR PROFILE OBSERVATION SYSTEM (71) Applicant: ZHEJIANG UNIVERSITY, Hangzhou (CN)

(72) Inventors: Hangzhou Wang, Hangzhou (CN); Yijie Wen, Hangzhou (CN); Jiajun Li, Hangzhou (CN); Junhao Zhu, Hangzhou (CN); Ying Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/190,850

(22) Filed: Apr. 28, 2025

(30) Foreign Application Priority Data

Oct. 29, 2024 (CN) .......................... 202411518255.7

(51) Int. Cl.
B63B 21/04 (2006.01)
G01C 13/00 (2006.01)
H01Q 1/34 (2006.01)

(52) U.S. Cl.
CPC ............... *B63B 21/04* (2013.01); *H01Q 1/34* (2013.01); *B63B 2205/00* (2013.01); *G01C 13/00* (2013.01)

(58) Field of Classification Search
CPC ...... B63B 21/04; B63B 2205/00; H01Q 1/34; G01C 13/00
See application file for complete search history.

(56) References Cited

U.S. PATENT DOCUMENTS 4,924,698 A * 5/1990 Echert .................... B63B 22/18
73/170.29
5,869,756 A * 2/1999 Doherty .................. B63B 22/18
405/188

FOREIGN PATENT DOCUMENTS

CN 113501091 A 10/2021

* cited by examiner

*Primary Examiner* — Anthony D Wiest
(74) *Attorney, Agent, or Firm* — Bayramoglu Law Offices LLC (57) ABSTRACT A release device for a polar profile observation system includes a support frame, a release base, a control electronic cabin, a release mechanism, and a floating body. The support frame performs an up and down profile movement along the under-ice guide cable, and is bonded with the profile observation system before the profile observation system is released. The release base is configured to provide an installation platform for the release mechanism. The control electronic cabin is configured to receive a release signal sent by the profile observation system and enable the release mechanism. The release mechanism is configured to perform a release task, so that the profile observation system can be detached from the support frame. The floating body provides buoyancy to balance the gravity of the release device.

7 Claims, 5 Drawing Sheets

RELEASE DEVICE FOR POLAR PROFILE OBSERVATION SYSTEM

CROSS REFERENCE TO THE RELATED APPLICATIONS

This application is based upon and claims priority to Chinese Patent Application No. 202411518255.7, filed on Oct. 29, 2024, the entire contents of which are incorporated herein by reference.

TECHNICAL FIELD

The present application relates to the technical field of underwater equipment, and in particular to a release device for a polar profile observation system.

BACKGROUND

In recent decades, the polar sea ice environment has changed significantly. In order to understand the underlying driving factors of these changes, it is very important to carry out long-term continuous profile observation of environmental parameters such as ocean temperature, salinity, depth, and current in polar ice areas, especially for the study on key scientific issues such as climate change, atmospheric circulation, marine ecology and marine biological systems. Ice Tethered Profiler (ITP) is an important polar ocean observation equipment, which is mainly composed of a surface floating body, a profile observation system, an under-ice guide cable and a weight. One end of the guide cable is connected to the surface floating body fixed on the sea ice, and the other end of the guide cable is connected to the underwater weight, so that the cable is in a straight state. The profile observation system carries out long-term profile monitoring of marine environmental parameters during the vertical movement along the cable. However, with the decrease and thinning of polar sea ice, these devices may lose their fixed foundations due to the rupture or melting of sea ice and drift with ocean currents. In the process of drifting, the underwater weight is easily prone to running aground in shallow water along the way, which leads to the relaxation and bending of the guide cable, and then makes the profile observation system unable to move up and down and get stuck. Therefore, the profile observation system needs to be equipped with a reliable release device to enable it to detach from the under-ice guide cable and continue the profile observation, thus ensuring the long-term and stable observation of marine environmental parameters by the profile observation system and providing key data support for polar marine scientific research and global climate change response.

SUMMARY

The purpose of the embodiment of the present application is to provide a release device for a polar profile observation system, which solves the problem that the profile observation system of polar ocean observation equipment cannot move up and down due to bottom dragging or running aground in the process of drifting with ocean currents after the ice layer breaks or melts.

The embodiment of the present application provides a release device for a polar profile observation system, which includes a support frame, a release base, a control electronic cabin, a release mechanism, a floating body, a profile observation system, and an under-ice guide cable.

The support frame performs an up and down profile movement along the under-ice guide cable, carries the release base, the control electronic cabin, the release mechanism and the floating body, and is attached to the profile observation system when release is not needed.

The release mechanism includes an elastic belt and a release spring, and the elastic belt surrounds the profile observation system, so that the support frame is bound with the profile observation system. The release spring is installed between the support frame and the profile observation system, and one end of the release spring is fixed on the support frame.

The floating body is configured to provide buoyancy to balance the gravity of the release device, so as to maintain a suspension state of the release device underwater.

The control electronic cabin is configured to enable the release mechanism after receiving a release signal sent by the profile observation system to release the elastic belt, so that the profile observation system is pushed by the release spring to be detached from the support frame to complete separation.

Further, the support frame includes a support frame main body, a guide ring, a limiting top block, and a cup-shaped groove.

A plurality of guide rings are distributed on an identical side of the support frame main body, each guide ring is provided with a through hole with a diameter larger than a line diameter of the under-ice guide cable, and the under-ice guide cable passes through the through holes of all the guide rings, so that the support frame is allowed to perform the up and down profile movement along the under-ice guide cable.

The limiting top block is fixed at two ends of the support frame main body and configured to limit the axial movement of the profile observation system in the state of being attached to the support frame.

The cup-shaped groove is fixed at the upper and lower ends of the support frame main body, one end of the release spring is installed in the cup-shaped groove, and the length of the release spring in a free state is greater than the sum of the depth of the cup-shaped groove and the inward length of the limiting top block.

Further, the support frame main body is an aluminum alloy annular semi-cylinder, and the position where the floating body is installed is hollowed out on the support frame.

Further, the control electronic cabin includes a pressure-resistant cabin, a low-temperature resistant storage battery and a control circuit that are arranged in the pressure-resistant cabin, and a watertight connector cable and an underwater radio frequency (RF) antenna that are arranged on an end cover of the pressure-resistant cabin.

The pressure-resistant cabin is installed on the support frame.

The watertight connector cable is connected to a watertight plug on the underwater motor in the release mechanism, and the low-temperature resistant storage battery and the control circuit provide power for the underwater motor through the watertight connector cable and enable the underwater motor to work.

The underwater RF antenna is configured to receive the release signal sent by the profile observation system and transmit the signal to the control circuit in the control electronic cabin, so that the control circuit controls the underwater motor to work.

Further, the pressure-resistant cabin is clamped and fixed by a control electronic cabin base and a control electronic cabin hoop and installed on the support frame.

Further, the release mechanism also includes an underwater motor and a trigger unit.

The underwater motor is arranged in a sealed cabin, the sealed cabin is clamped and fixed by an underwater motor hoop and an underwater motor base, and the watertight plug connected to the control electronic cabin is arranged on the sealed cabin.

Two ends of the elastic belt are pressed by an elastic belt joint, and the elastic belt joint is connected to the trigger unit.

The trigger unit is configured to trigger a release action of the elastic belt and the release spring to realize the release of the profile observation system.

Further, the trigger unit includes a release dial, a release hinge rod, a release trigger, a release lever, a release fork, a tension spring, a tension bracket, and a pull wire. One end of the pull wire is anchored on the release dial, and the other end of the pull wire is tensioned by the underwater motor after bypassing the tension bracket. The release dial is hinged with the release hinge rod. The release trigger, the release lever, and the release fork are fixed on the release base. The elastic belt joint is connected to the release fork through a pin. The tension spring is arranged between the release lever and the release base and configured to provide a constant elastic force to pull the release lever.

Further, the floating body is divided into two parts, installed at the upper and lower ends of the support frame, and distributed at the upper and lower sides of the control electronic cabin and the release mechanism.

Further, the magnitude of the designed buoyancy of the floating body is determined by the gravity of the support frame, the release base, the control electronic cabin, the release mechanism and the floating body.

The technical solution provided by the embodiments of the present application can include the following beneficial effects:

As can be seen from the above embodiments, the present application provides a release device for a polar profile observation system. When the profile observation system does not need to be released, the elastic belt binds the profile observation system to the annular semi-cylindrical surface of the support frame by its elastic force, the elastic belt is fixed and tightened by the release fork in the trigger unit, and the generated torque is reversely balanced by the release lever. When the profile observation system sends out a release signal, the underwater RF antenna located at the end cover of the control electronic cabin receives the release signal, and the control circuit inside the electronic cabin enables the underwater motor to rotate and gradually pull the release dial through the pull wire, and the release hinge rod hinged on the release dial is pulled to jack up the release lever to rotate, resulting in the reverse torque acting on the release fork being cancelled. Further, the release fork rotates under the elastic force of the elastic belt, and the release spring then releases the compression elastic force to push the profile observation system outward, so that the elastic belt is completely separated from the release fork, and the whole release task of the profile observation system is completed. The mechanical trigger mode has the characteristics of simple structure and high trigger efficiency, and the underwater motor and the trigger unit are respectively provided with two sets in the trigger mechanism, and the redundant trigger strategy is adopted to ensure that at least one set of trigger mechanism can work normally under the expected operating conditions, thereby improving the reliability and release success rate of the release device.

It should be understood that both the foregoing general description and the following detailed description are exemplary and explanatory only and are not restrictive of the present application.

BRIEF DESCRIPTION OF THE DRAWINGS

The drawings, which are incorporated in and constitute a part of this description, illustrate embodiments consistent with the present application and together with the description, serve to explain the principles of the present application.

The reference numerals in the figures are as follows: 1. support frame; 11. guide ring; 12. limiting top block; 13. cup-shaped groove; 2. release base; 3. control electronic cabin; 31. watertight connector cable; 32. underwater RF antenna; 33. control electronic cabin base; 34. control electronic cabin hoop; 4. release mechanism; 410. underwater motor; 411. underwater motor hoop; 412. underwater motor base; 413. watertight plug; 420. release dial; 421. release hinge rod; 422. release trigger; 423. release lever; 424. release fork; 425. tension spring; 426. tension bracket; 427. pull wire; 430. elastic belt; 431. elastic belt joint; 44. release spring; 5. floating body; 6. profile observation system; and 7. under-ice guide cable.

DETAILED DESCRIPTION OF THE EMBODIMENTS

Exemplary embodiments will be illustrated in detail here, examples of which are illustrated in the drawings. When the following description refers to the drawings, unless otherwise indicated, the same numbers in different drawings indicate the same or similar elements. The implementations described in the following exemplary embodiments do not represent all implementations consistent with the present application.

The terminology used in the present application is only for the purpose of describing specific embodiments only and is not intended to limit the present application. The singular forms "a" and "the" used in the present application and the appended claims are also intended to include the plural forms, unless the context clearly indicates other meaning. It should also be understood that the term "and/or" as used herein refers to and includes any or all possible combinations of one or more associated listed items.

It should be understood that although the terms first, second, third, etc. may be used in the present application to describe various information, the information should not be limited to these terms. These terms are only used to distinguish the same type of information from each other. For example, without departing from the scope of the present application, the first information can also be called the second information, and similarly, the second information can also be called the first information. Depending on the context, the word "if" as used herein can be interpreted as "when" or "in response to determination".

Figure 1:
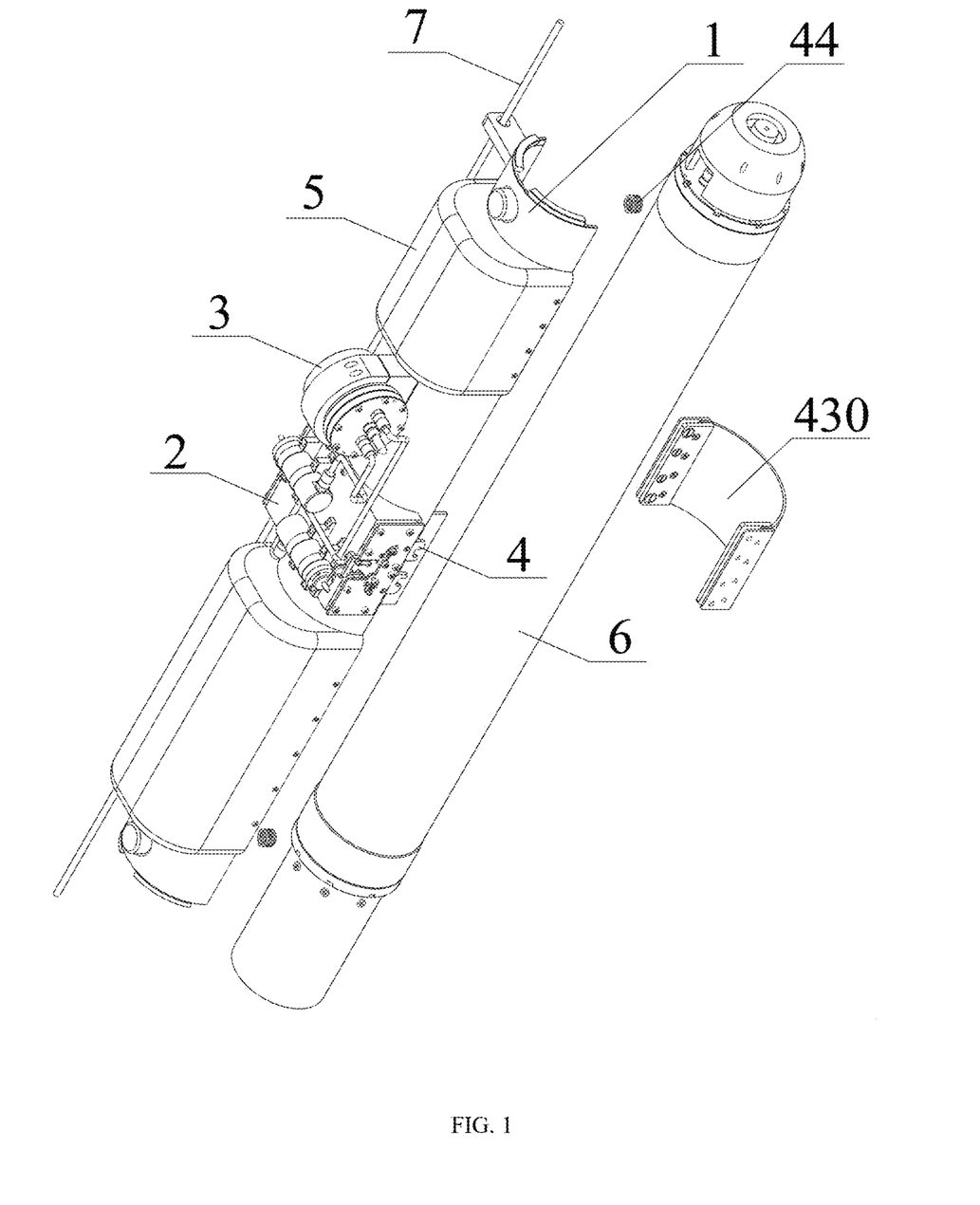
FIG. 1 is a schematic structural diagram of a release device for a polar profile observation system according to the present invention.

FIG. 1 is a schematic structural diagram of a release device for a polar profile observation system according to an exemplary embodiment, which includes a support frame 1, a release base 2, a control electronic cabin 3, a release mechanism 4, a floating body 5, a profile observation system 6, and an under-ice guide cable 7. Specifically, the support frame 1 performs an up and down profile movement along the under-ice guide cable 7, carries the release base 2, the control electronic cabin 3, the release mechanism 4 and the floating body 5, and is attached to the profile observation system 6 when release is not needed. The release mechanism 4 includes an elastic belt 430 and a release spring 44, and the elastic belt 430 surrounds the profile observation system 6, so that the support frame 1 is bound with the profile observation system 6. The release spring 44 is installed between the support frame 1 and the profile observation system 6, and one end of the release spring 44 is fixed on the support frame 1. The floating body 5 is configured to provide buoyancy to balance the gravity of the release device, so as to maintain a suspension state of the release device underwater. The control electronic cabin 3 is configured to enable the release mechanism 4 after receiving a release signal sent by the profile observation system 6 to release the elastic belt 430, so that the profile observation system 6 is pushed by the release spring 44 to be detached from the support frame 1 to complete separation.

Figure 2:
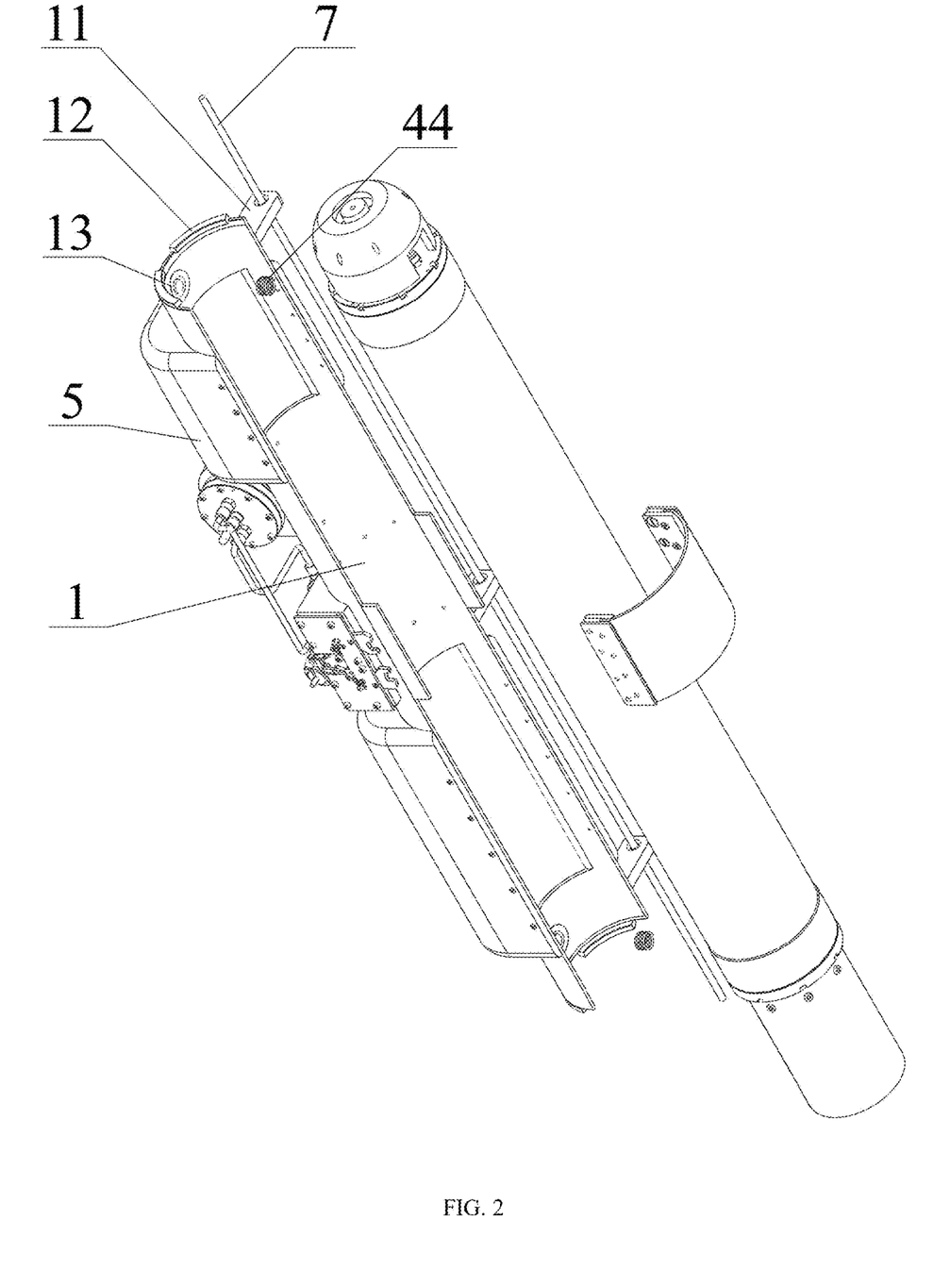
FIG. 2 is a schematic structural diagram view of a support frame according to the present invention.

More specifically, as shown in FIG. 2, the support frame 1 includes a support frame main body, a guide ring 11, a limiting top block 12, and a cup-shaped groove 13. The main body of the support frame 1 is an aluminum alloy annular semi-cylinder, and at least three guide rings 11 are provided and uniformly distributed on an identical side of the support frame 1 to provide stable axial guidance and maintain the vertical upward posture of the support frame 1. The guide ring 11 is provided with a round-corner through hole with a diameter greater than the line diameter of the under-ice guide cable 7, and configured to allow the under-ice guide cable 7 made of an aramid fiber material to pass through, so as to realize the stable mooring of the profile observation system 6 on the cable. The round-corner through hole is designed to remove sharp edges between the under-ice guide cable 7 and the guide ring 11 and reduce wear. The limiting top block 12 is welded at two distal ends of the support frame 1 to limit the axial movement of the profile observation system 6 in the state of being attached to the support frame 1. The cup-shaped groove 13 is welded at the upper and lower ends of the support frame 1, and one end of the release spring 44 is installed in the cup-shaped groove. Considering that the limiting top block 12 has a certain length inward, the length of the release spring 44 in a free state is greater than the sum of the depth of the cup-shaped groove 13 and the inward length of the limiting top block 12. Two positions where the floating body 5 is installed are hollowed out on the support frame 1 to reduce the gravity of the support frame 1.

In an embodiment, the release base 2 is attached to the support frame 1 through an arc surface, and the other surfaces are all flat, and the whole body is made of aluminum alloy.

Figure 3:
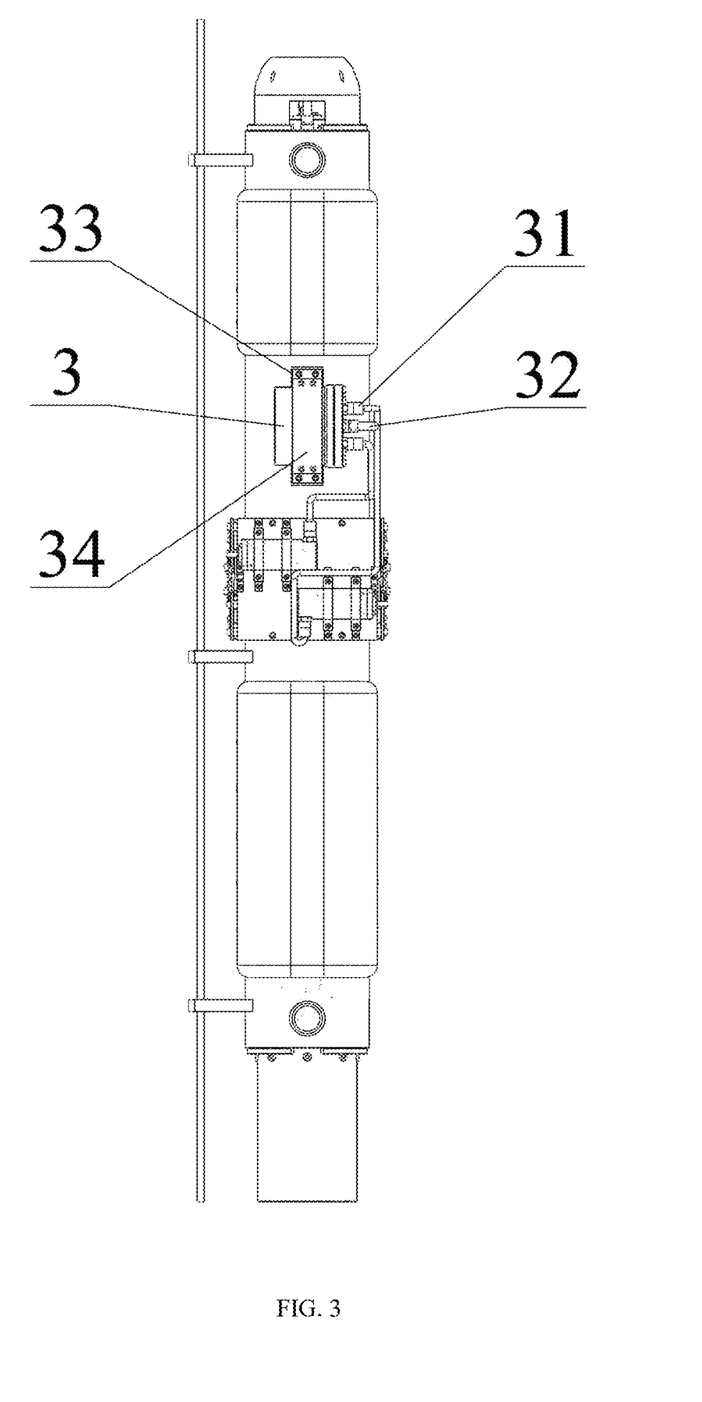
FIG. 3 is a schematic structural diagram of a control electronic cabin according to the present invention.

More specifically, as shown in FIG. 3, the control electronic cabin 3 includes a pressure-resistant cabin formed by a sealed end cover and a sealed cabin body, a low-temperature resistant storage battery and a control circuit that are arranged inside the pressure-resistant cabin, and a watertight connector cable 31 and an underwater RF antenna 32 that are arranged on the end cover of the pressure-resistant cabin. The pressure-resistant cabin is made of aluminum alloy and is clamped and fixed on the support frame 1 by a control electronic cabin base 33 and a control electronic cabin hoop 34. The two watertight connector cables 31 are connected to watertight plugs 413 on two underwater motors 410 in the release mechanism 4, and the low-temperature resistant storage battery and the control circuit provide power for the underwater motors 410 through the watertight connector cables 31 and enable the underwater motors 410 to work. The underwater RF antenna 32 is configured to receive the release signal sent by the profile observation system 6 and transmit the signal to the control circuit in the control electronic cabin 3, so that the control circuit controls the underwater motors 410 to work. The control electronic cabin base 33 is fixed on the support frame 1 with screws, and the control electronic cabin base 33 and the control electronic cabin hoop 34 are combined with screws to surround and clamp the control electronic cabin 3 and fix the control electronic cabin 3.

Figure 4:
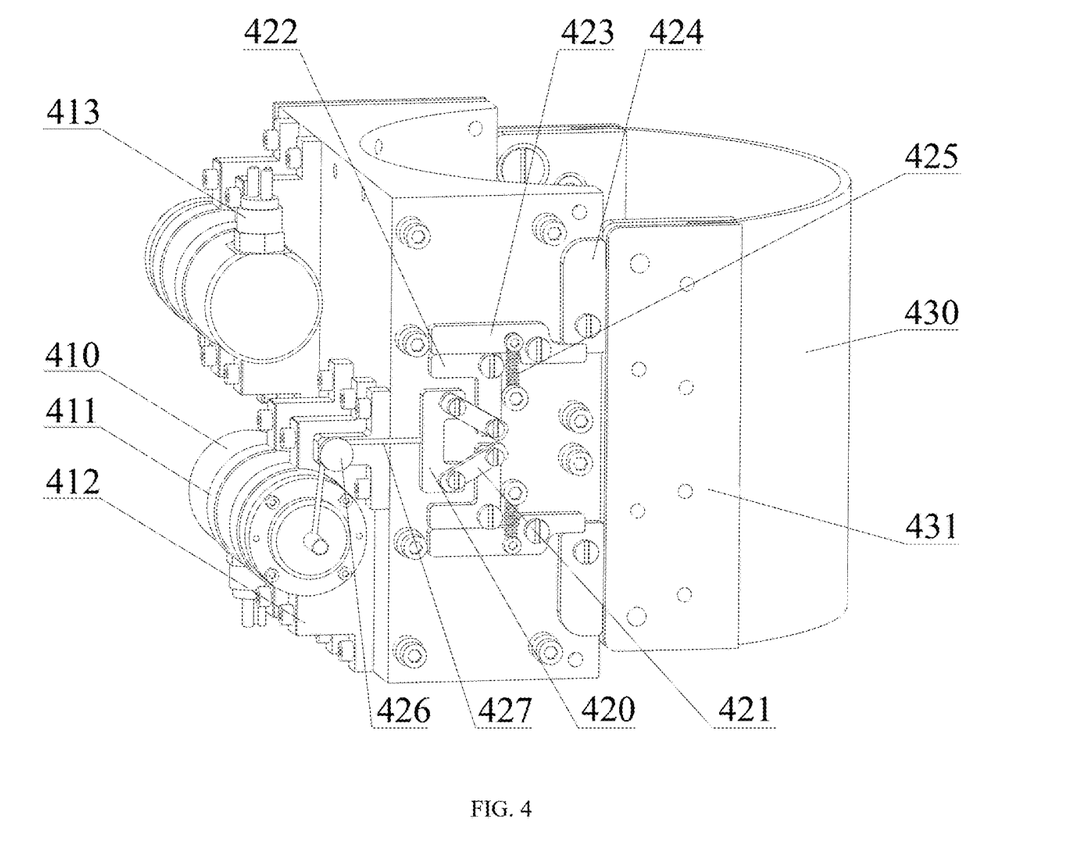
FIG. 4 is a schematic structural diagram of a release mechanism according to the present invention.

More specifically, as shown in FIG. 4, the release mechanism includes an underwater motor 410, the elastic belt 430 and the release spring 44, and a trigger unit includes a release dial 420, a release hinge rod 421, a release trigger 422, a release lever 423, a release fork 424, a tension spring 425, a tension bracket 426, and a pull wire 427. A sealed cabin is clamped and fixed by the underwater motor hoop 411 and the underwater motor base 412. The underwater motor 410 is a miniature brushed direct current (DC) motor, which is installed in the sealed cabin to isolate seawater and prevent water pressure from affecting the motor. A plane is milled on a side wall of the sealed cabin of the underwater motor 410 as a sealing surface of the watertight plug 413, and the plug led out from the sealed cabin is screwed on the side wall of the sealed cabin, so that the side wall of the sealed cabin is provided with the watertight plug 413 connected to the watertight connector cable 31. One end of the pull wire 427 passes through the rotating shaft of the underwater motor 410, and the other end of the pull wire 427 is moored to the release dial 420. The tension bracket 426 tightens the pull wire 427 to keep the underwater motor 410 and the release dial 420 running synchronously. The release dial 420 is hinged with the release hinge rod 421, and the release trigger 422, the release lever 423 and the release fork 424 are fixed on the release base 2 through shoulder bolts. The tension spring 425 is hooked on the fixing bolts of the release lever 423 and the release base 2, respectively, and is configured to provide a constant elastic force to pull the release lever 423, establish a static equilibrium state, and resist the false triggering caused by external small disturbing force. Two ends of the elastic belt 430 are pressed by the elastic belt joint 431, and the elastic belt joint 431 is connected to the release fork 424 through a pin.

In an embodiment, two sets of underwater motors 410 are installed on both sides of the release base 2. Two sets of trigger units are deployed in total, and symmetrically distributed on the left and right sides of the release base, and one side is driven by a cam mechanism and includes a release dial, two release hinge rods, two release triggers, two release levers, two release forks, and two tension springs, where the release trigger, the release lever, and the release fork on one side are all installed on the release base through screws. The release dial is hinged at ends of the release hinge rods through screws, and the other ends of the release hinge rods are respectively hinged with the distal ends of the release triggers. Ends of the tension springs are respectively fixed on the release base, and the other ends of the tension springs are respectively fixed on the release levers. The elastic belt is tightly pressed at the two end joints by the pre-tightening force of the screw, and the two end joints of the elastic belt are connected to the left and right four release forks of the release base through pins. The release springs are installed in two cup-shaped grooves welded at the upper and lower ends of the support frame, and the length of the release spring in a free state exceeds the sum of the depth of the cup-shaped groove and the inward length of the limiting top block.

Figure 5:
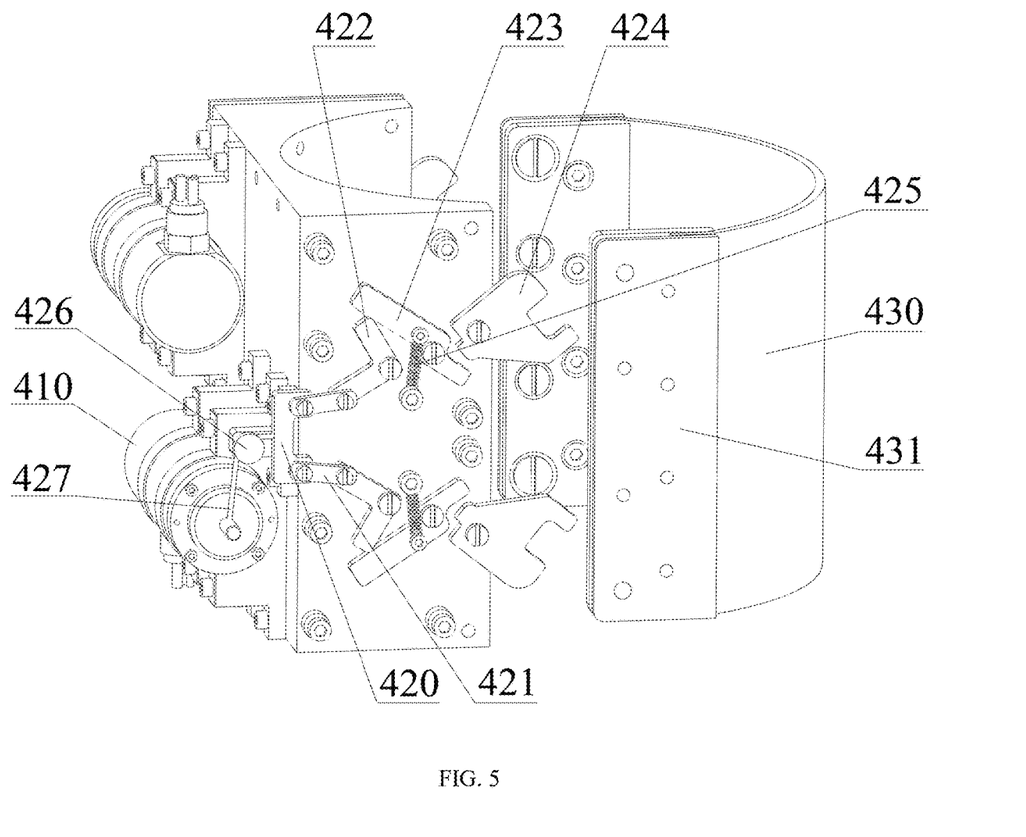
FIG. 5 is a schematic structural diagram of the release mechanism of the present invention when triggered.

More specifically, FIG. 5 is a schematic structural diagram of the release mechanism of the present invention when triggered. After the underwater motor 410 is enabled, the pull wire 427 threaded on the rotating shaft of the underwater motor 410 is tightened, and simultaneously pulls the release dial 420 towards the tension bracket 426. The release hinge rod 421 drives an end of the release trigger 422 to jack up the release lever 423. At this time, the reverse torque introduced by the release trigger 422 is greater than the torque generated by the elastic force of the tension spring 425, so the release lever 423 rotates to cancel the reverse balance torque generated by an action of the release lever 423 on the release fork 424 against the elastic force of the elastic belt 430, and then the release fork 424 rotates under the elastic force of the elastic belt 430. At this time, the release spring 44 releases the compression elastic force to push the profile observation system 6 outwardly, so that the elastic belt 430 is completely decoupled and separated from the release fork 424 to complete the release process of the profile observation system 6.

In an embodiment, the floating body 5 is a polyvinyl chloride (PVC) foam board, and its surface is sprayed with polyurea. The floating body 5 is divided into two parts and fixed at the upper and lower ends of the support frame 1 by screws, and distributed at the upper and lower sides of the control electronic cabin 3 and the release mechanism 4, so as to enhance the balance stability of suspension of the release device for the polar profile observation system underwater. Since the profile observation system 6 needs to be detached from the under-ice guide cable 7 to continue profile observation, the profile observation system 6 needs the ability to change its own buoyancy, and can freely switch its negative buoyancy, zero buoyancy, and positive buoyancy. The magnitude of the designed buoyancy of the floating body 5 is determined by the gravity of the release device for the polar profile observation system including the support frame 1, the release base 2, the control electronic cabin 3, the release mechanism 4 and the floating body 5. The floating body 5 is configured to provide buoyancy to balance the gravity of the release device, so that the release device for the polar profile observation system can be kept in a suspension state of zero buoyancy underwater.

In the concrete implementation process, the support frame 1 performs an up and down profile movement along the under-ice guide cable 7, carries the release base 2, the control electronic cabin 3, the release mechanism 4 and the floating body 5, and is attached to the profile observation system 6 to form a binding when the profile observation system 6 does not need to be released. The release base 2 is configured to provide an installation platform for the release mechanism 4 and plays a role of fixing and supporting. The control electronic cabin 3 is configured to receive the release signal sent by the profile observation system 6 and enable the release mechanism 4 and is responsible for power transmission and signal reception. The release mechanism 4 can be driven by the power of the control electronic cabin 3 to perform the release process, so that the profile observation system 6 can be detached from the support frame 1. The floating body 5 provides buoyancy to balance the gravity of the release device, so that the net buoyancy of the whole release device is zero, and the release device maintains a suspension state underwater. The profile observation system 6 moves up and down along the under-ice guide cable 7 to observe the polar profile. When the profile observation system 6 is trapped and needs to be detached, the release mechanism 4 is triggered, and the profile observation system 6 is detached from the support frame 1 to complete the separation. The under-ice guide cable 7 passes through the support frame 1, and the support frame 1 is attached to and bonded with the profile observation system 6 when the profile observation system 6 does not need to be released, so as to realize the safe mooring and stable movement of the profile observation system 6 under the ice layer before being released.

The purpose of the present invention is to ensure that the profile observation system 6 can perform observation stably in the polar subglacial environment before it is released, and that the profile observation system 6 can be safely released by triggering the release mechanism 4 under driving of the power supply of the control electronic cabin 3 when it needs to be released, so that it can independently complete the profile observation task.

Other embodiments of the present application will easily occur to those skilled in the art after considering the specification and practicing the present disclosure herein. The present application is intended to cover any variations, uses, or adaptation charges of the present application, and these variations, uses, or adaptation charges follow the general principles of the present application and include common sense or common technical means in this technical field that are not disclosed in the present application.

It should be understood that the present application is not limited to the precise structure described above and shown in the drawings, and various modifications and changes can be made without departing from its scope.

What is claimed is:

1. A release device for a polar profile observation system, comprising a support frame, a release base, a control electronic cabin, a release mechanism, a floating body, a profile observation system, and an under-ice guide cable; wherein the support frame performs an up and down profile movement along the under-ice guide cable, carries the release base, the control electronic cabin, the release mechanism and the floating body, and is attached to the profile observation system when a release is not needed;

the release mechanism comprises an elastic belt and a release spring, and the elastic belt surrounds the profile observation system, so that the support frame is bound with the profile observation system; the release spring is installed between the support frame and the profile observation system, and an end of the release spring is fixed on the support frame;

the floating body is configured to provide buoyancy to balance a gravity of the release device, so as to maintain a suspension state of the release device underwater;

the control electronic cabin is configured to enable the release mechanism after receiving a release signal sent by the profile observation system to release the elastic belt, so that the profile observation system is pushed by the release spring to be detached from the support frame to complete separation;

the release mechanism further comprises an underwater motor and a trigger unit;

the underwater motor is arranged in a sealed cabin, the sealed cabin is clamped and fixed by an underwater motor hoop and an underwater motor base, and a watertight plug connected to the control electronic cabin is arranged on the sealed cabin;

two ends of the elastic belt are pressed by an elastic belt joint, and the elastic belt joint is connected to the trigger unit; and the trigger unit is configured to trigger a release action of the elastic belt and the release spring to realize the release of the profile observation system; the trigger unit comprises a release dial, a release hinge rod, a release trigger, a release lever, a release fork, a tension spring, a tension bracket, and a pull wire; a first end of the pull wire is anchored on the release dial, and a second end of the pull wire is tensioned by the underwater motor after bypassing the tension bracket; the release dial is hinged with the release hinge rod; the release trigger, the release lever, and the release fork are fixed on the release base; the elastic belt joint is connected to the release fork through a pin; and the tension spring is arranged between the release lever and the release base and configured to provide a constant elastic force to pull the release lever.

2. The release device according to claim 1, wherein the support frame comprises a support frame main body, a guide ring, a limiting top block, and a cup-shaped groove;

a plurality of guide rings are distributed on an identical side of the support frame main body, each of the plurality of guide rings is provided with a through hole with a diameter larger than a line diameter of the under-ice guide cable, and the under-ice guide cable passes through the through hole of each of the plurality of guide rings, so that the support frame is allowed to perform the up and down profile movement along the under-ice guide cable;

the limiting top block is fixed at two ends of the support frame main body and configured to limit an axial movement of the profile observation system in a state of being attached to the support frame; and the cup-shaped groove is fixed at upper and lower ends of the support frame main body, the end of the release spring is installed in the cup-shaped groove, and a length of the release spring in a free state is greater than a sum of a depth of the cup-shaped groove and an inward length of the limiting top block.

3. The release device according to claim 2, wherein the support frame main body is an aluminum alloy annular semi-cylinder, and a position where the floating body is installed is hollowed out on the support frame.

4. The release device according to claim 1, wherein the control electronic cabin comprises a pressure-resistant cabin, a low-temperature resistant storage battery, a control circuit, a watertight connector cable, and an underwater radio frequency (RF) antenna, wherein the low-temperature resistant storage battery and the control circuit are arranged in the pressure-resistant cabin, and the watertight connector cable and the underwater RF antenna are arranged on an end cover of the pressure-resistant cabin;

the pressure-resistant cabin is installed on the support frame;

the watertight connector cable is connected to the watertight plug on the underwater motor in the release mechanism, and the low-temperature resistant storage battery and the control circuit provide power for the underwater motor through the watertight connector cable and enable the underwater motor to work; and the underwater RF antenna is configured to receive the release signal sent by the profile observation system and transmit the release signal to the control circuit in the control electronic cabin, so that the control circuit controls the underwater motor to work.

5. The release device according to claim 4, wherein the pressure-resistant cabin is clamped and fixed by a control electronic cabin base and a control electronic cabin hoop and installed on the support frame.

6. The release device according to claim 1, wherein the floating body is divided into two parts, installed at upper and lower ends of the support frame, and distributed at upper and lower sides of the control electronic cabin and the release mechanism.

7. The release device according to claim 1, wherein a magnitude of a designed buoyancy of the floating body is determined by a gravity of the support frame, the release base, the control electronic cabin, the release mechanism and the floating body.

\* \* \* \* \*